United States Patent
Hwang

(10) Patent No.: US 11,523,222 B2
(45) Date of Patent: Dec. 6, 2022

(54) FLAT SPEAKER AND VEHICLE INCLUDING THE SAME

(71) Applicants: Hyundai Motor Company, Seoul (KR); Kia Corporation, Seoul (KR)

(72) Inventor: Yonghwan Hwang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/245,606

(22) Filed: Apr. 30, 2021

(65) Prior Publication Data

US 2022/0109937 A1 Apr. 7, 2022

(30) Foreign Application Priority Data

Oct. 6, 2020 (KR) .......................... 10-2020-0128469

(51) Int. Cl.
| | |
|---|---|
| *H04R 17/00* | (2006.01) |
| *B60R 16/02* | (2006.01) |
| *H04R 3/00* | (2006.01) |
| *H04R 1/02* | (2006.01) |

(52) U.S. Cl.
CPC .............. *H04R 17/00* (2013.01); *B60R 16/02* (2013.01); *H04R 1/025* (2013.01); *H04R 3/00* (2013.01); *H04R 2499/13* (2013.01)

(58) Field of Classification Search
CPC .......... H04R 17/00; H04R 1/025; H04R 3/00; H04R 2499/13; B60R 16/02
See application file for complete search history.

(56) References Cited

U.S. PATENT DOCUMENTS

| | | | | |
|---|---|---|---|---|
| 2012/0057730 A1* | 3/2012 | Fujise | .................... | H04R 17/00 381/190 |
| 2020/0301186 A1* | 9/2020 | Nagasaki | ................ | G06F 3/016 |
| 2020/0341729 A1* | 10/2020 | Tanaka | .................... | G10L 15/22 |

FOREIGN PATENT DOCUMENTS

JP 2005003777 A * 1/2005

OTHER PUBLICATIONS

Translation of JP-2005003777-A Jan. 2005.*
Renewable Energy Followers, "Produce electricity (power), piezo-electric elements!", retrieved from https://renewableenergyfollowers.org/2208, Jul. 14, 2017, 8 pages.

* cited by examiner

*Primary Examiner* — Andrew L Sniezek
(74) *Attorney, Agent, or Firm* — Slater Matsil, LLP

(57) ABSTRACT

A flat speaker includes a plurality of horizontal frames provided on a substrate and dividing the substrate into a plurality of rows, a plurality of vertical frames provided on the substrate and dividing each of the plurality of rows into a plurality of columns, a plurality of piezoelectric elements provided on each side of the plurality of vertical frames and configured to contract and expand according to a voltage signal, a plurality of electrodes configured to apply the voltage signal to the piezoelectric elements, and a controller configured to control the voltage signal applied to the plurality of electrodes.

20 Claims, 6 Drawing Sheets

20-1 ~ 20-5 : 20
30a-1 ~ 30a-4 : 30a
30b-1 ~ 30b-4 : 30b
30c-1 ~ 30c-4 : 30c
30d-1 ~ 30d-4 : 30d
30a ~ 30d : 30

FLAT SPEAKER AND VEHICLE INCLUDING THE SAME

CROSS-REFERENCE TO RELATED APPLICATIONS

This application claims the benefit of Korean Patent Application No. 10-2020-0128469, filed in the Korean Intellectual Property Office on Oct. 6, 2020, which application is hereby incorporated herein by reference.

TECHNICAL FIELD

The present invention relates to a flat speaker and a vehicle including the same.

BACKGROUND

Since the voice coil type speaker provided in a vehicle generates sound waves by moving the diaphragm, when outputting a sound with a large sound pressure level or a low frequency sound, movement of the diaphragm is very large, and noise is generated.

In addition, since the voice coil type speaker essentially requires a magnetic field for moving the voice coil, and requires a baffle and an enclosure, it occupies a large volume in a limited space in a vehicle.

SUMMARY

The present invention relates to a flat speaker including a piezoelectric element and a vehicle including the same. Particular embodiments relate to a flat speaker including a piezoelectric element and a vehicle including the same.

An embodiment of the present invention provides a flat speaker that prevents noise generated by movement of a diaphragm and requires a relatively small volume in a vehicle, and a vehicle including the same.

A flat speaker according to an exemplary embodiment may include a substrate, a plurality of horizontal frames configured to be provided on the substrate and to divide the substrate into a plurality of rows, a plurality of vertical frames configured to be provided on the substrate and to divide each of the plurality of rows into a plurality of columns, a plurality of piezoelectric elements configured to be provided on each side of the plurality of vertical frames and to contract and expand according to a voltage signal, a plurality of electrodes configured to apply the voltage signal to the piezoelectric element, and a controller configured to control the voltage applied to the plurality of electrodes.

The plurality of vertical frames may include a plurality of first vertical frames configured to divide any one row among the plurality of rows into a plurality of columns and a plurality of second vertical frames configured to divide another row adjacent to the any one row into a plurality of columns, and the plurality of first vertical frames and the plurality of second vertical frames may be alternately arranged.

The plurality of electrodes may be provided on both sides of each of the plurality of piezoelectric elements.

The plurality of piezoelectric elements and the plurality of horizontal frames may form a plurality of cells independent from each other on the substrate, and the plurality of piezoelectric elements may contract and expand in a direction parallel to the horizontal frame according to the voltage signal to change the volume of the plurality of cells.

The plurality of piezoelectric elements may include a first piezoelectric element and a second piezoelectric element forming any one of the plurality of cells, and the controller may control voltages applied to the plurality of electrodes so that the first piezoelectric element and the second piezoelectric element expand and contract simultaneously.

The plurality of piezoelectric elements may include first piezoelectric elements forming a first cell among the plurality of cells, and second piezoelectric elements forming a second cell, and the controller may control voltages applied to the plurality of electrodes so that a voltage applied to the first piezoelectric elements is greater than a voltage applied to the second piezoelectric elements.

The first cell may be located closer to a center of the substrate than the second cell.

A height of each of the plurality of horizontal frames, a height of each of the plurality of vertical frames, and a height of each of the plurality of piezoelectric elements may be the same.

A separation distance between the plurality of horizontal frames may be equal to the width of each of the plurality of vertical frames and the width of each of the plurality of piezoelectric elements.

A vehicle according to an exemplary embodiment may include the flat speaker.

The flat speaker may further includes an audio video navigation (AVN) device, and the controller may control the intensity and frequency of voltages applied to the plurality of electrodes based on the sound signal output from the AVN device.

The flat speaker according to an exemplary embodiment of the present disclosure may occupy a small volume and may provide an optimal sound.

BRIEF DESCRIPTION OF THE DRAWINGS

These and/or other aspects of the present invention will become apparent and more readily appreciated from the following description of the embodiments, taken in conjunction with the accompanying drawings of which.

DETAILED DESCRIPTION OF ILLUSTRATIVE EMBODIMENTS

Figure 1:
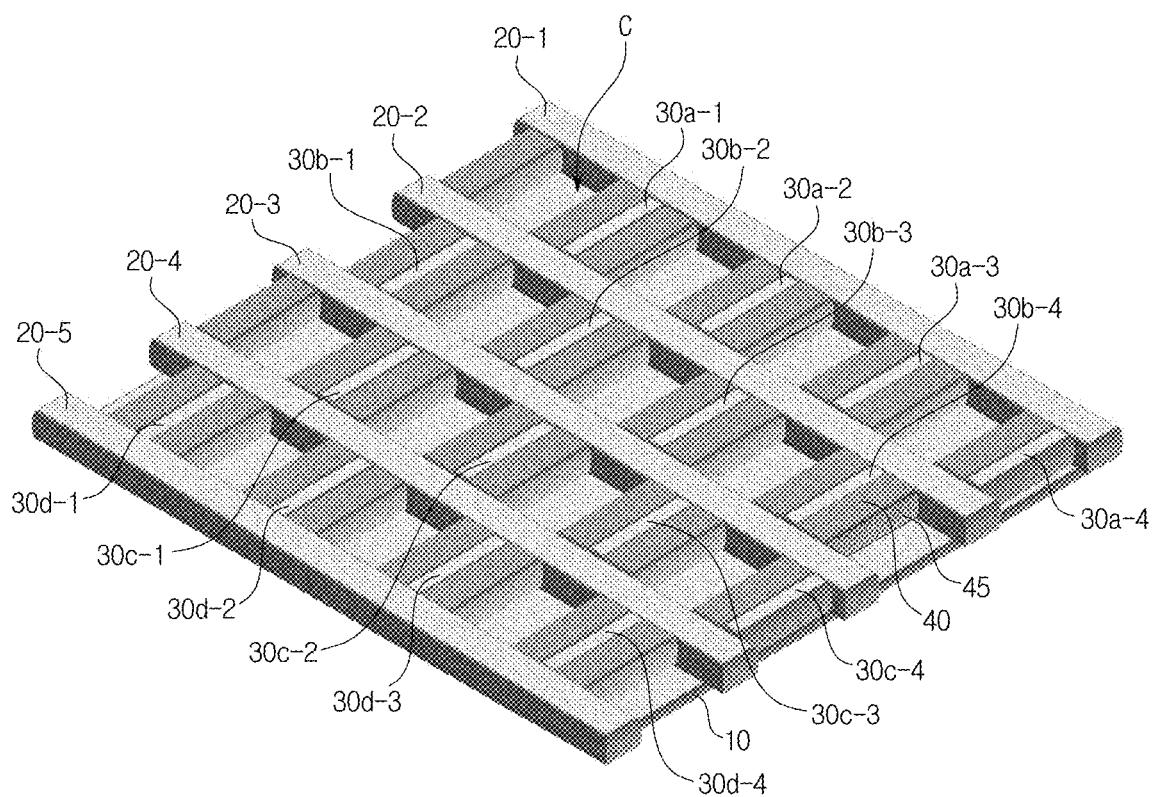
FIG. 1 is a perspective view of a flat speaker according to an exemplary embodiment of the present invention.

Hereinafter, embodiments of the present disclosure will be described in detail with reference to the accompanying drawings. In designating elements of the drawings by reference numerals, the same elements will be designated by the same reference numerals although they are shown in different drawings. Further, in the following description of embodiments of the present disclosure, a detailed description of known functions and configurations incorporated herein will be omitted when it may make the subject matter of the present disclosure rather unclear.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~ part", "~ module", "~ member", "~ block", etc., may be implemented in software or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in the present specification, identify the presence of stated features, integers, steps, operations, elements, and/or components, but do not preclude the presence or addition of one or more other features, integers, steps, operations, elements, components, and/or groups thereof, unless the context clearly indicates otherwise.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present invention will be described with reference to the accompanying drawings.

Figure 2:
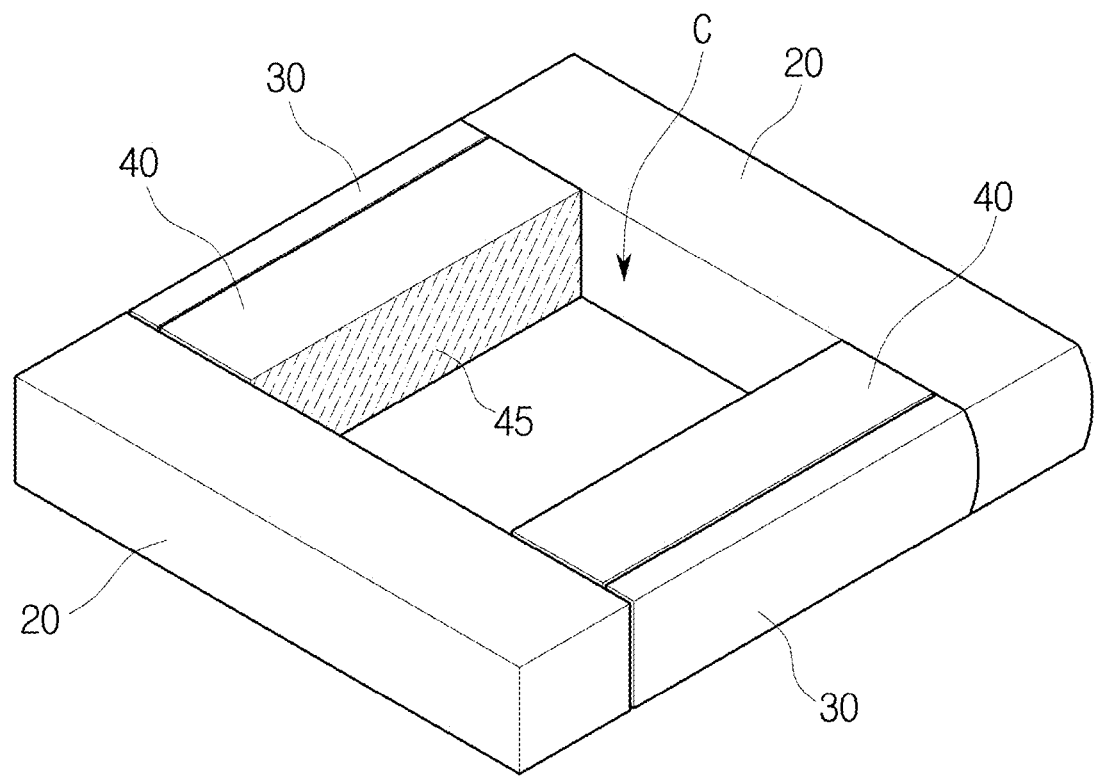
FIG. 2 a perspective view of one cell included in a flat speaker according to an exemplary embodiment of the present invention.
Figure 3:
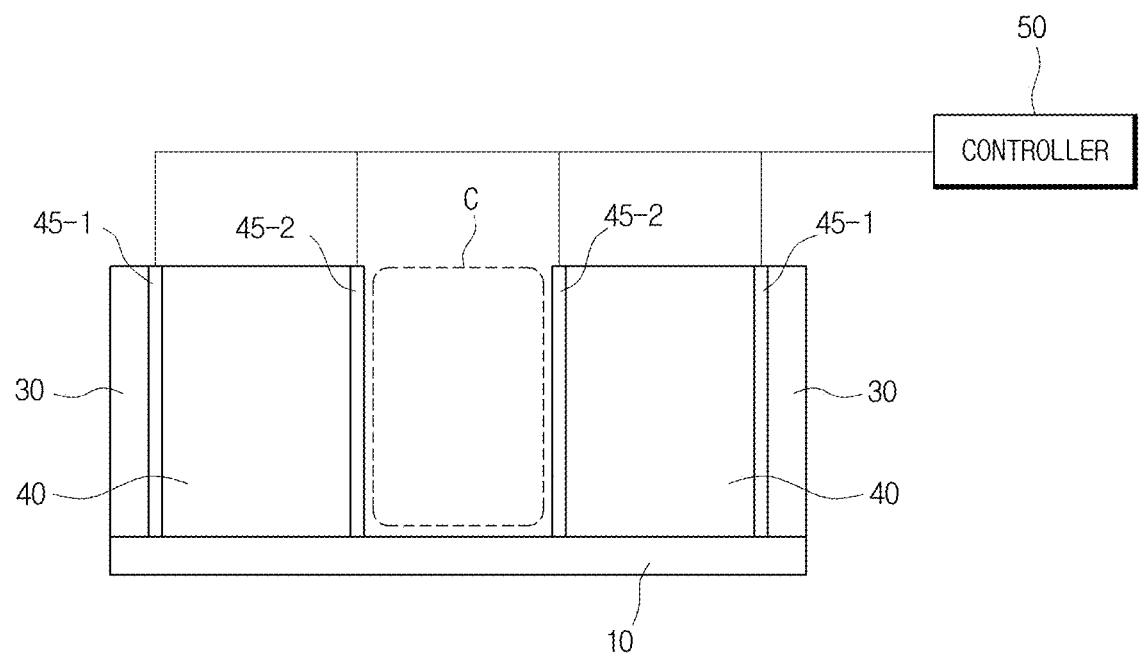
FIG. 3 is a cross-sectional view of one cell included in a flat speaker according to an exemplary embodiment of the present invention.

Referring to FIGS. 1 to 3, the flat speaker according to an exemplary embodiment may include a substrate 10, a plurality of horizontal frames 20, a plurality of vertical frames 30, a plurality of piezoelectric elements 40, a plurality of electrodes 45, and a controller 50.

The substrate 10 may be formed in a rectangular shape, but the shape of the substrate 10 is not limited thereto.

The plurality of horizontal frames 20 may be provided on the substrate 10 to divide the substrate 10 into a plurality of rows. The plurality of horizontal frames 20 may be spaced apart from each other at the same distance and arranged on the substrate 10, thereby dividing the substrate 10 into a plurality of rows.

For example, a portion of the substrate 10 interposed by a first horizontal frame 20-1 and a second horizontal frame 20-2 may be divided into a first row, a portion on the substrate 10 interposed by the second horizontal frame 20-2 and a third horizontal frame 20-3 may be divided into a second row, a portion on the substrate 10 interposed by the third horizontal frame 20-3 and a fourth horizontal frame 20-4 may be divided into a third row, and a portion on the substrate 10 interposed by the fourth horizontal frame 20-4 and a fifth horizontal frame 20-5 may be divided into a fourth row.

The flat speaker illustrated in FIG. 1 is an example of a flat speaker according to an exemplary embodiment of the present invention, and the number of the plurality of horizontal frames 20 and the number of a plurality of rows divided accordingly are not limited.

In addition, the plurality of vertical frames 30 may be provided on the substrate 10 to divide each of the plurality of rows divided according to the plurality of horizontal frames 20 into a plurality of columns. The plurality of vertical frames 30 dividing the same row may be spaced apart from each other at the same distance and arranged on the substrate 10, thereby dividing the plurality of rows into a plurality of columns.

For example, a portion on the substrate 10 interposed by a first vertical frame 30$a$-1 and a second vertical frame 30$a$-2 in the first row may be divided into the first column of the first row, a portion on the substrate 10 interposed by the second vertical frame 30$a$-2 and a third vertical frame 30$a$-3 in the first row may be divided into a second column of the first row, and a portion on the substrate 10 interposed by the third vertical frame 30$a$-3 and a fourth vertical frame 30$a$-4 in the first row may be divided into a third column of the first row.

As above, the second row, the third row, and the fourth row may also be divided into a plurality of columns by the plurality of vertical frames 30 provided in each row. That is, vertical frames 30$b$-1, 30$b$-2, 30$b$-3, and 30$b$-4 provided in the second row may divide the second row into a plurality of columns, the vertical frames 30$c$-1, 30$c$-2, 30$c$-3, and 30$c$-4 provided in the third row may divide the third row into a plurality of columns, and the vertical frames 30$d$-1, 30$d$-2, 30$d$-3, and 30$d$-4 provided in the fourth row may divide the fourth row into a plurality of columns.

The plurality of vertical frames 30 dividing any one row among a plurality of rows into a plurality of columns and the plurality of vertical frames 30 dividing a row adjacent to any one row into a plurality of columns may be alternately arranged with each other.

Specifically, a plurality of first vertical frames 30$a$ dividing a first row into a plurality of columns and a plurality of second vertical frames 30$b$ dividing a second row into a plurality of columns may be alternately arranged.

Similarly, the plurality of second vertical frames 30$b$ dividing a second row into a plurality of columns and a plurality of third vertical frames 30$c$ dividing a third row into a plurality of columns may be alternately arranged, and the plurality of third vertical frames 30$c$ dividing the third row into a plurality of columns and a plurality of fourth vertical frames 30$d$ dividing the fourth row into a plurality of columns may be alternately arranged.

The meaning that the plurality of first vertical frames 30$a$ and the plurality of second vertical frames 30$b$ are alternately arranged means they do not overlap with the plurality of second vertical frames 30$b$ when the plurality of first vertical frames 30$a$ are extended in the vertical direction.

The alternate arrangement of the plurality of first vertical frames 30$a$ and the plurality of second vertical frames 30$b$ may mean that they do not overlap with the plurality of second vertical frames 30$b$ when the plurality of first vertical frames 30$a$ are extended in the vertical direction.

That is, assuming that the plurality of first vertical frames 30$a$ and the plurality of second vertical frames 30$b$ are arranged in the same row, the plurality of first vertical frames 30$a$ and the plurality of second vertical frames 30$b$ may be arranged crossing each other.

When the plurality of vertical frames 30 dividing any one row among a plurality of rows into a plurality of columns and the plurality of vertical frames 30 dividing a row adjacent to any one row into a plurality of columns are not alternately arranged with each other, the arrangement of a plurality of cells to be described later becomes a line array, thereby incurring directionality in the flat speaker.

That is, since the plurality of vertical frames 30 dividing any one row from among a plurality of rows into a plurality of columns, and the plurality of vertical frames 30 dividing a row adjacent to the any one row into a plurality of columns alternate with each other, the sound waves generated in each cell may not interfere with each other.

Both the plurality of horizontal frames 20 and the plurality of vertical frames 30 may be fixed on the substrate 10, and an angle formed by each of the plurality of horizontal frames 20 and each of the plurality of vertical frames 30 may be a right angle.

The plurality of piezoelectric elements 40 that contract and expand in a direction parallel to the horizontal frame (left and right directions) according to a voltage signal may be provided on each side of the plurality of vertical frames 30.

The piezoelectric element 40 refers to an element having a property of exhibiting positive and negative charges proportional to an external force on both sides of a plate when pressure is applied in a certain direction or expanding or contracting when a voltage is applied to both sides of the plate.

The plurality of piezoelectric elements 40 may be provided to be parallel to the plurality of vertical frames 30 and orthogonal to the plurality of horizontal frames 20, thereby contracting and expanding in a direction parallel to the horizontal frame 20 according to a voltage signal applied from the electrode 45.

A height of each of the plurality of horizontal frames 20 provided on the substrate 10, a height of each of the plurality of vertical frames 30, and a height of each of the plurality of piezoelectric elements 40 may be the same, thereby effectively forming a plurality of cells described below.

The plurality of electrodes 45 may be provided on both sides of each of the plurality of piezoelectric elements 40 to apply a voltage signal to the piezoelectric elements 40.

Such a plurality of electrodes 45 may include a first electrode 45-1 provided between one side of the vertical frame 30 and one side of the piezoelectric element 40 and a second electrode 45-2 provided on the other side of the piezoelectric element 40. One of the first electrode 45-1 or the second electrode 45-2 may be connected to the ground, and the other electrode may be applied with a control voltage. The plurality of piezoelectric elements 40 and the plurality of horizontal frames 20 may form a plurality of cells (C) independent from each other. In this case, the plurality of cells C may mean empty spaces in which the front, rear, left, right, and lower sides are blocked.

To this end, a separation distance between the plurality of horizontal frames 20 may be the same as the widths of the plurality of piezoelectric elements 40 and the widths of the plurality of vertical frames 30.

For example, an empty space surrounded by the piezoelectric element 40 provided on the right side of the first vertical frame 30a-1, the piezoelectric element 40 provided on the left side of the second vertical frame 30a-2, the first horizontal frame 20-1 and the second horizontal frame 20-2 may be formed on the substrate 10, and this empty space is referred to as a cell C.

The volume of the plurality of cells C may change according to the contraction and expansion of the piezoelectric elements 40.

Figure 4:
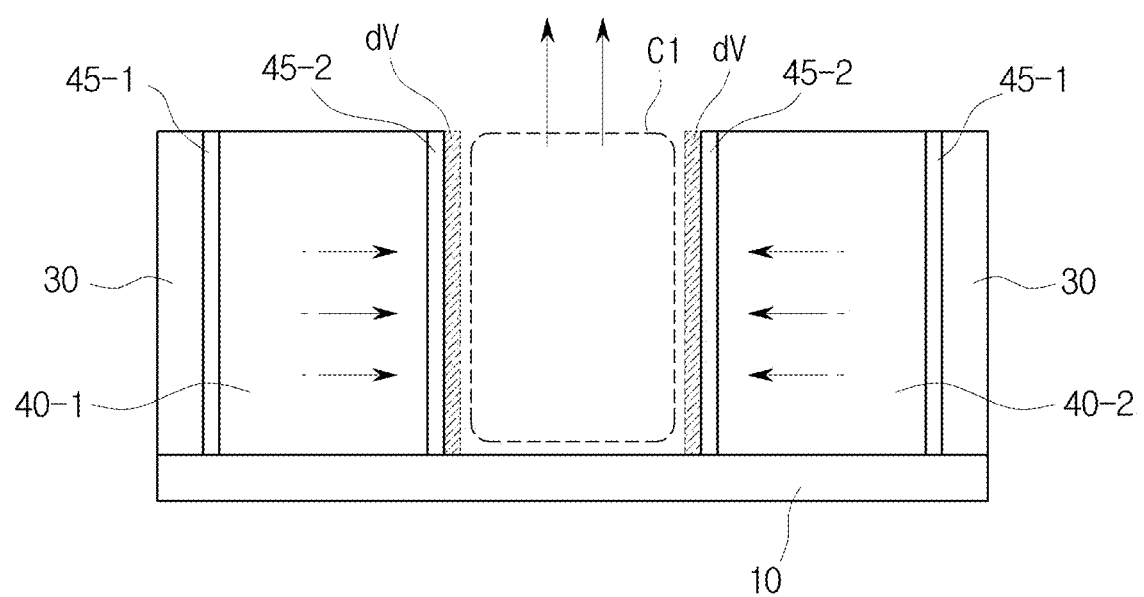
FIG. 4 is a diagram illustrating a case where a piezoelectric element is expanded according to an exemplary embodiment of the present invention.

Referring to FIG. 4, when the piezoelectric elements 40 forming any one cell C1 among the plurality of cells C are referred to as a first piezoelectric element 40-1 and a second piezoelectric element 40-2, the volume of the cell C1 may decrease if the first piezoelectric element 40-1 and the second piezoelectric element 40-2 expand at the same time.

For example, when the first electrode 45-1 is connected to the ground and the second electrode 45-2 is applied with a voltage signal from the controller 50, the controller 50 may control the first piezoelectric element 40-1 and the second piezoelectric element 40-2 to expand simultaneously by applying a positive voltage to the second electrode 45-2.

In this case, each of the first piezoelectric element 40-1 and the second piezoelectric element 40-2 expands by dV, so that the volume of the cell C1 formed by the first piezoelectric element 40-1 and the second piezoelectric element 40-2 may be reduced by 2 dV. That is, the cell C1 formed by the first piezoelectric element 40-1 and the second piezoelectric element 40-2 may contract in response to the application of a positive voltage to the first piezoelectric element 40-1 and the second piezoelectric element 40-2.

As the volume of the cell C1 formed by the first piezoelectric element 40-1 and the second piezoelectric element 40-2 decreases, the air inside the cell C1 is pushed out.

Figure 5:
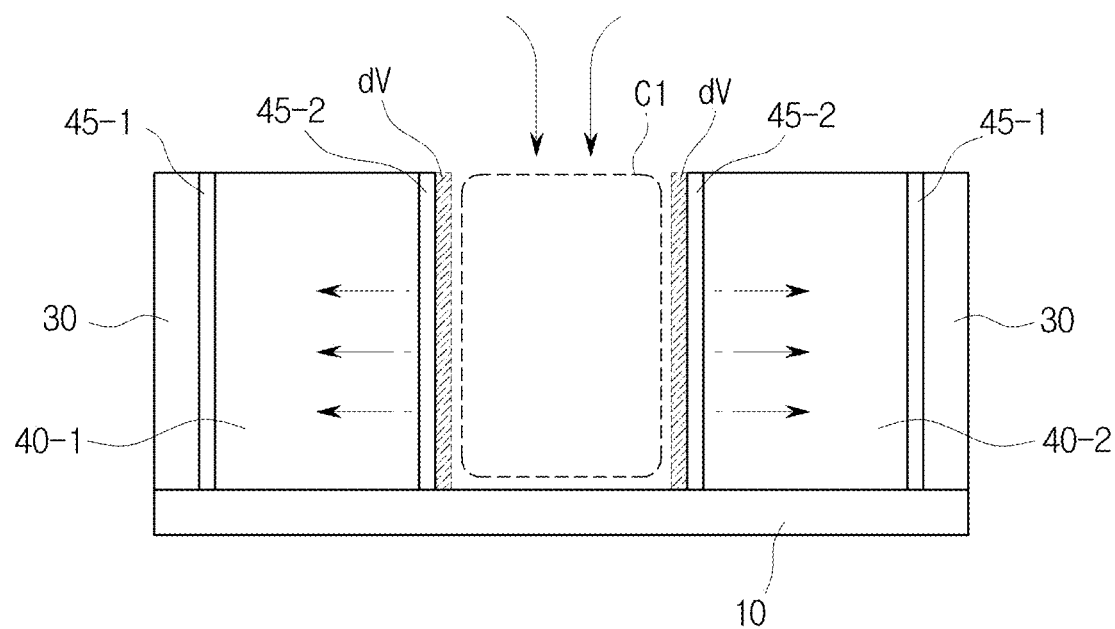
FIG. 5 is a diagram illustrating a case where a piezoelectric element contracts according to an exemplary embodiment of the present invention.

Referring to FIG. 5, when the piezoelectric elements 40 forming any one cell C1 among the plurality of cells C are referred to as the first piezoelectric element 40-1 and the second piezoelectric element 40-2, the volume of the cell C1 may increase if the first piezoelectric element 40-1 and the second piezoelectric element 40-2 contract at the same time.

For example, when the first electrode 45-1 is connected to the ground and the second electrode 45-2 is applied with a voltage signal from the controller 50, the controller 50 may control the first piezoelectric element 40-1 and the second piezoelectric element 40-2 to contract simultaneously by applying a negative voltage to the second electrode 45-2.

In this case, each of the first piezoelectric element 40-1 and the second piezoelectric element 40-2 contracts by dV, so that the volume of the cell C1 formed by the first piezoelectric element 40-1 and the second piezoelectric element 40-2 may be increased by 2 dV. That is, the cell C1 formed by the first piezoelectric element 40-1 and the second piezoelectric element 40-2 may expand in response to the application of a negative voltage to the first piezoelectric element 40-1 and the second piezoelectric element 40-2.

As the volume of the cell C1 formed by the first piezoelectric element 40-1 and the second piezoelectric element 40-2 increases, air outside the cell C1 is introduced into the cell.

In this way, when the controller 50 repeatedly applies a positive voltage and a negative voltage to the second electrode 45-2, the process of air being discharged to the outside of the cell C1 and flowing into the cell is repeated, thereby generating sound waves.

The controller 50 may output a sound desired by the user by adjusting the intensity and frequency of the voltage applied to the second electrode 45-2 based on the sound signal received from the external device.

For example, the controller 50 may adjust the intensity and frequency of the voltage applied to the second electrode 45-2 based on sound signals such as music, video, and navigation sound output from the vehicle AVN device.

For this, the controller 50 may include at least one memory storing a program for performing the above-described operation and an operation described below, and at least one processor executing the stored program.

When the controller 50 includes a plurality of memories and a plurality of processors, the plurality of memories and the plurality of processors may be directly connected to one chip or may be physically separated.

In FIG. 3, the controller 50 is shown to be connected to each electrode 45, but the controller 50 may be connected to the substrate 10, and the substrate 10 may be connected to each electrode to apply a voltage signal to each electrode based on a control signal from the controller 50.

Assuming that one cell, two piezoelectric elements forming one cell, and four electrodes provided on the two piezoelectric elements are one sound output unit, as described above, the flat speaker according to an exemplary embodiment may include a plurality of sound output units.

The controller 50 may independently control each of the plurality of sound output units.

Specifically, the plurality of piezoelectric elements 40 may include first piezoelectric elements forming a first cell among the plurality of cells C, and second piezoelectric elements forming a second cell, and the controller 50 may control voltages applied to the plurality of electrodes 45 so that the level of the voltage applied to the first piezoelectric elements is greater than the level of the voltage applied to the second piezoelectric elements.

The controller 50 may independently apply a voltage to electrodes provided in the first piezoelectric elements and electrodes provided in the second piezoelectric elements to output sounds having different sound pressure levels, with respect to a first sound output unit including first piezoelectric elements forming a first cell and a second sound output unit including second piezoelectric elements forming a second cell.

Figure 6:
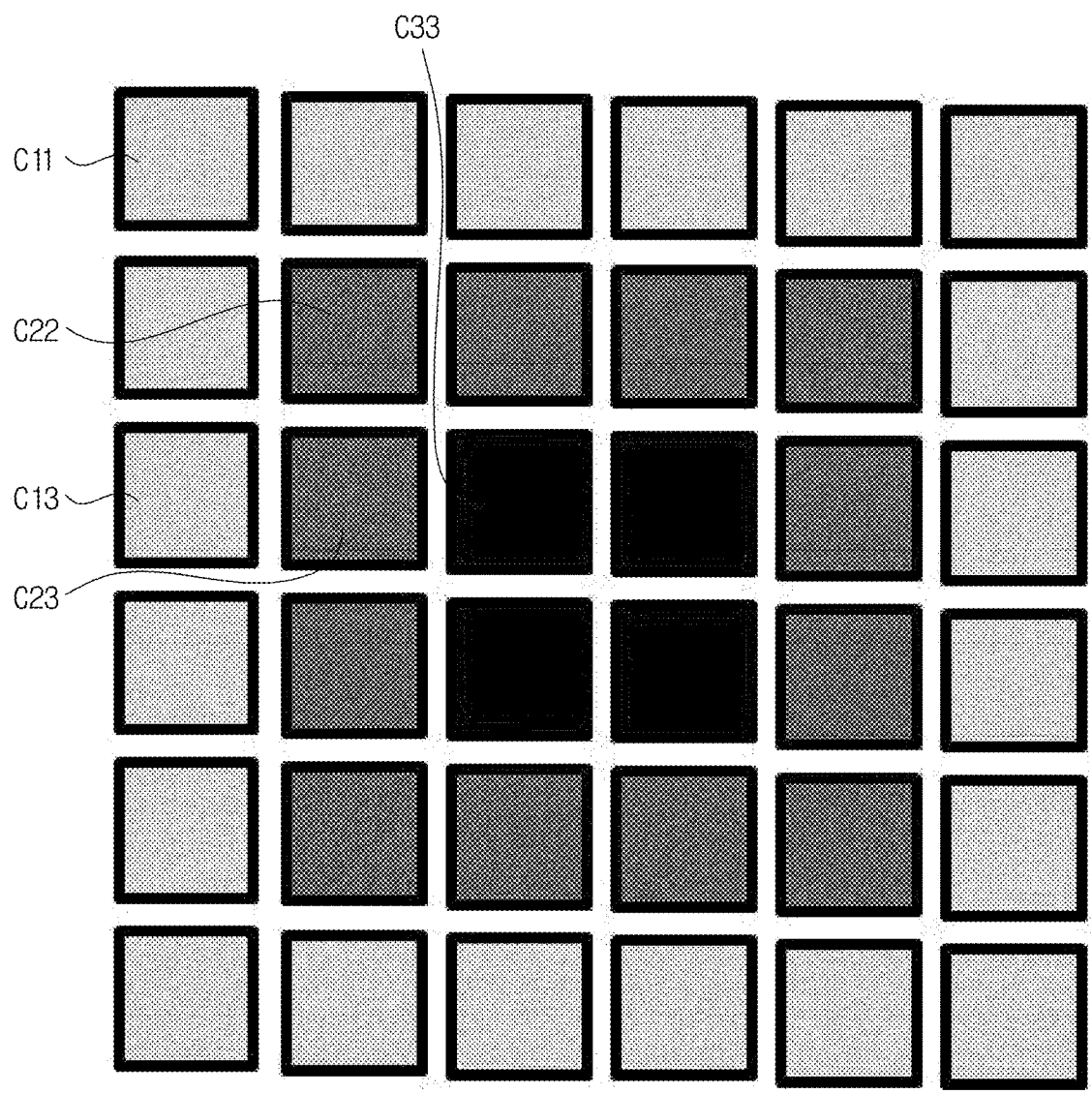
FIG. 6 is a diagram illustrating a sound pressure distribution of sound waves output from a plurality of cells included in a flat speaker according to an exemplary embodiment of the present invention.

Referring to FIG. 6, the voltage applied to the piezoelectric elements forming a first cell C11 may be smaller than the voltage applied to the piezoelectric elements forming a second cell C22, and the voltage applied to the piezoelectric elements forming the second cell C22 may be smaller than the voltage applied to the piezoelectric elements forming a third cell C33.

Likewise, the voltage applied to the piezoelectric elements forming the fourth cell C13 may be smaller than the voltage applied to the piezoelectric elements forming the fifth cell C23, and the voltage applied to the piezoelectric elements forming the fifth cell C23 may be smaller than the voltage applied to the piezoelectric elements forming the third cell C33.

That is, the controller 50 may apply a larger voltage to piezoelectric elements forming cells positioned closer to a center of the substrate 10.

The sound output unit located closer to the center of the substrate 10 outputs sound with a higher sound pressure level, and the sound waves generated from the flat speaker as a whole are arranged in a Gaussian distribution form, thereby generating directivity of sound waves and reducing offsetting phenomenon of sound waves.

The distribution shape of the sound pressure level shown in FIG. 6 is only an example, and the distribution shape of the sound pressure level may be set differently according to an embodiment. As an example, the controller 50 may implement a steering technique that generates directivity of sound waves by independently controlling each sound output unit.

The flat speaker according to an exemplary embodiment may be attached to the interior of a vehicle, and accordingly, may output various sounds inside the vehicle.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the present invention have been described for illustrative purposes, those skilled in the art will appreciate that various modifications, additions and substitutions are possible, without departing from the scope and spirit of the present invention. Therefore, exemplary embodiments of the present invention have not been described for limiting purposes.

What is claimed is:

1. A flat speaker comprising:
  a substrate;
  a plurality of horizontal frames provided on the substrate and dividing the substrate into a plurality of rows;
  a plurality of vertical frames provided on the substrate and dividing each of the plurality of rows into a plurality of columns;
  a plurality of piezoelectric elements provided on each side of the plurality of vertical frames and configured to contract and expand according to a voltage signal;
  a plurality of electrodes configured to apply the voltage signal to the piezoelectric elements; and
  a controller configured to control the voltage signal applied to the plurality of electrodes,
  wherein the plurality of piezoelectric elements and the plurality of horizontal frames form a plurality of cells independent from each other on the substrate;
  wherein the plurality of piezoelectric elements are configured to contract and expand in a direction parallel to the horizontal frames according to the voltage signal to change a volume of the plurality of cells;
  wherein the plurality of piezoelectric elements comprise first piezoelectric elements forming a first cell among the plurality of cells and second piezoelectric elements forming a second cell; and
  wherein the controller is configured to control voltages applied to the plurality of electrodes so that a voltage applied to the first piezoelectric elements is greater than a voltage applied to the second piezoelectric elements.

2. The flat speaker according to claim 1, wherein the plurality of vertical frames comprises a plurality of first vertical frames dividing any one row among the plurality of rows into a plurality of columns and a plurality of second vertical frames dividing another row adjacent to the any one row into a plurality of columns, wherein the plurality of first vertical frames and the plurality of second vertical frames are alternately arranged.

3. The flat speaker according to claim 2, wherein the flat speaker is mounted in a vehicle.

4. The flat speaker according to claim 1, wherein the plurality of electrodes are provided on both sides of each of the plurality of piezoelectric elements.

5. The flat speaker according to claim 1, wherein the controller is configured to control voltages applied to the plurality of electrodes so that each of the first piezoelectric elements expand and contract simultaneously.

6. The flat speaker according to claim 5, wherein the first cell is configured to expand in response to application of a positive voltage to the first piezoelectric elements, and to contract in response to application of a negative voltage to the first piezoelectric elements.

7. The flat speaker according to claim 1, wherein the first cell is located closer to a center of the substrate than the second cell.

8. The flat speaker according to claim 1, wherein a height of each of the plurality of horizontal frames, a height of each of the plurality of vertical frames, and a height of each of the plurality of piezoelectric elements are the same.

9. The flat speaker according to claim 1, wherein a separation distance between each of the plurality of horizontal frames is equal to a width of each of the plurality of vertical frames and a width of each of the plurality of piezoelectric elements.

10. The flat speaker according to claim 1, wherein the flat speaker is mounted in a vehicle.

11. A vehicle comprising:
an audio video navigation (AVN) device; and
a flat speaker comprising:
a plurality of horizontal frames provided on a substrate and dividing the substrate into a plurality of rows;
a plurality of vertical frames provided on the substrate and dividing each of the plurality of rows into a plurality of columns;
a plurality of piezoelectric elements provided on each side of the plurality of vertical frames and configured to contract and expand according to a voltage signal;
a plurality of electrodes configured to apply the voltage signal to the piezoelectric elements; and
a controller configured to control an intensity and frequency of voltages applied to the plurality of electrodes based on a sound signal output from the AVN device;
wherein the plurality of piezoelectric elements and the plurality of horizontal frames form a plurality of cells independent from each other on the substrate; and
wherein the plurality of piezoelectric elements are configured to contract and expand in a direction parallel to the horizontal frame according to the voltage signal to change a volume of the plurality of cells.

12. The vehicle according to claim 11, wherein the plurality of vertical frames comprises a plurality of first vertical frames dividing any one row among the plurality of rows into a plurality of columns and a plurality of second vertical frames dividing another row adjacent to the any one row into a plurality of columns, wherein the plurality of first vertical frames and the plurality of second vertical frames are alternately arranged.

13. The vehicle according to claim 11, wherein the plurality of electrodes are provided on both sides of each of the plurality of piezoelectric elements.

14. The vehicle according to claim 11, wherein a height of each of the plurality of horizontal frames, a height of each of the plurality of vertical frames, and a height of each of the plurality of piezoelectric elements are the same.

15. The vehicle according to claim 11, wherein a separation distance between each of the plurality of horizontal frames is equal to a width of each of the plurality of vertical frames and a width of each of the plurality of piezoelectric elements.

16. A flat speaker comprising:
a plurality of horizontal frames provided on a substrate and dividing the substrate into a plurality of rows;
a plurality of vertical frames provided on the substrate and dividing each of the plurality of rows into a plurality of columns;
a plurality of piezoelectric elements provided on each side of the plurality of vertical frames and configured to contract and expand according to a voltage signal;
a plurality of electrodes configured to apply the voltage signal to the piezoelectric elements; and
a controller configured to control the voltage signal applied to the plurality of electrodes;
wherein the plurality of piezoelectric elements and the plurality of horizontal frames form a plurality of cells independent from each other on the substrate; and
wherein the plurality of piezoelectric elements are configured to contract and expand in a direction parallel to the horizontal frame according to the voltage signal to change a volume of the plurality of cells.

17. The flat speaker according to claim 16, wherein:
the plurality of piezoelectric elements comprises a first piezoelectric element and a second piezoelectric element forming any one of the plurality of cells; and
the controller is configured to control voltages applied to the plurality of electrodes so that the first piezoelectric element and the second piezoelectric element expand and contract simultaneously.

18. The flat speaker according to claim 17, wherein the any one of the plurality of cells is configured to expand in response to application of a positive voltage to the first piezoelectric element and the second piezoelectric element, and to contract in response to application of a negative voltage to the first piezoelectric element and the second piezoelectric element.

19. The flat speaker according to claim 16, wherein:
the plurality of piezoelectric elements comprise first piezoelectric elements forming a first cell among the plurality of cells and second piezoelectric elements forming a second cell;
the first cell is located closer to a center of the substrate than the second cell; and
the controller is configured to control voltages applied to the plurality of electrodes so that a voltage applied to the first piezoelectric elements is greater than a voltage applied to the second piezoelectric elements.

20. The flat speaker according to claim 19, wherein the flat speaker is mounted in a vehicle.

* * * * *